United States Patent
Hetherington et al.

(10) Patent No.: US 6,390,156 B1
(45) Date of Patent: May 21, 2002

(54) METHOD AND SYSTEM FOR TRANSFER OF FLUID AND DRY MATERIALS FROM AN INVERTED HOLDING CONTAINER TO A PAIRED DOCKING STATION RECEPTACLE

(76) Inventors: Michael Hetherington, 19138 McCowan Rd., Mount Albert, Ontario (CA), L0G 1M0; Richard Charles Pahl, 436 Date Palm Ct. NE., St Petersburg, FL (US) 33703

( * ) Notice: Subject to any disclaimer, the term of this patent is extended or adjusted under 35 U.S.C. 154(b) by 0 days.

(21) Appl. No.: 09/896,706

(22) Filed: Jun. 29, 2001

(51) Int. Cl.[7] .............................. B65B 1/04; B65B 3/00; B67C 3/00
(52) U.S. Cl. ..................... 141/351; 141/346; 141/348; 141/363; 141/364; 141/365; 141/366; 141/2
(58) Field of Search .................................. 141/346–348, 141/2, 351, 352, 363–366, 325, 319; 222/160, 511, 518

(56) References Cited

U.S. PATENT DOCUMENTS

| | | | | |
|---|---|---|---|---|
| 5,031,676 A | * | 7/1991 | Ulm | 141/346 |
| 5,431,205 A | * | 7/1995 | Gebhard | 141/351 |
| 5,960,840 A | | 10/1999 | Simmel | |
| 5,996,653 A | * | 12/1999 | Piccinino, Jr. | 141/346 |
| 6,158,486 A | * | 12/2000 | Olson et al. | 141/351 |

* cited by examiner

*Primary Examiner*—Timothy L. Maust
(74) *Attorney, Agent, or Firm*—Dorothy S. Morse (57) ABSTRACT

A dispensing system and method for locked spill-free transfer of liquid and dry materials. The dispensing assembly attached to the material holding container has a bottle cap with a slotted spring housing, small notch, spring-biased valve closure member with activation pin, and spring nut with cutout. The paired docking station receptacle includes a housing having an upper flange, bottom discharge opening, interior protrusion, and upwardly tapering spring nut engagement member with spaced-apart radially-extending flukes positioned within the discharge opening, the upper surface of which are configured for partial insertion through the spring nut cutout. Thus, when the protrusion is aligned with the notch and a bayonet turn is applied to the bottle cap, the spring nut engagement member unseats the valve closure member and allows material transfer. The dispensing system herein can be used by manufacturers of equipment requiring periodic renewal of dry and liquid materials to limit their source.

20 Claims, 4 Drawing Sheets

METHOD AND SYSTEM FOR TRANSFER OF FLUID AND DRY MATERIALS FROM AN INVERTED HOLDING CONTAINER TO A PAIRED DOCKING STATION RECEPTACLE

BACKGROUND—FIELD OF INVENTION

This invention relates to the field of systems for the gravity-assisted transfer of liquid or dry material from one container into another, specifically to a dispensing system, and a method for its manufacture, which has a threaded bottle cap style of dispensing assembly that can be securely locked into a paired receptacle to provide both hands-free and spill-free material transfer. The restrictive configuration of the receptacle, specific to that of its paired dispensing assembly, prevents similar locking connection with nearly all other types of dispensing assemblies. Also, the spring-biased valve closure member of the paired dispensing assembly remains in a closed configuration to block material flow until the dispensing assembly becomes fully seated within the receptacle. Flow only occurs while the dispensing assembly is within the receptacle and is blocked again as soon as the dispensing assembly begins to be drawn away from the receptacle. The present invention dispensing assembly comprises a bottle cap member, valve closure member, coil spring, spring nut, spring housing upwardly depending from the bottom inside surface bottle cap member, small holes through the bottom surface of the bottle cap member adjacent to the spring housing, and at least one notch through the bottom rim of the bottle cap member with a side channel adjacent to and above the rim. Further, the spring housing has a top central opening through which the activation pin of the valve closure member is inserted when it is in both its open position immediately above the spring housing and its closed position engaging the upper surface of the spring housing. In its closed position, the valve closure member covers the small holes through the bottom surface of the bottle cap member and blocks material flow. The receptacle of the present invention has a housing with an upper opening sufficiently wide for receipt of the entire bottle cap member, a protrusion on its inside surface at a height allowing the protrusion to enter the bottle cap member's side channel and the channel to rotate relative to the protrusion once the dispensing assembly is fully positioned within the receptacle, a discharge opening centrally through the bottom of the housing, an upper flange radially extending from the upper opening for use in secure positioning of the receptacle housing during connection and disconnection of the dispensing assembly, and a spring nut engagement member secured within the discharge opening. Optionally, the receptacle can have a hinged dust cap configured to temporarily seal its upper opening between material transfer uses. To initiate material flow with the present invention, one first attaches the threaded end of dispensing assembly to an upright container holding material targeted for transfer, and secures the paired receptacle to the top portion of the intended receiving vessel. The holding container is then inverted, without any of the material therein being spilled, and the bottom rim of the bottle cap member moved toward the receptacle. As the holding container is manipulated to insert the connected bottle cap member into the receptacle, one must rotate the bottle cap member relative to the receptacle while simultaneously moving the bottle cap member longitudinally closer to the receptacle bottom, so that the protrusion on the inside surface of the receptacle is able to pass through a notch in the bottom rim to enter the side channel adjacent to the bottom rim. When the bottle cap member becomes fully seated within the receptacle, several things happen. The top surface of the spring nut engagement member in the receptacle pushes against the tip of the activation pin to unseat the valve closure member a short distance to initiate material flow, and continued rotation of the bottle cap member repositions the channel relative to the protrusion to transport the notch away from the protrusion and thereby lock the dispensing assembly to the receptacle. The coil spring within the spring housing automatically draws the valve closure member back into its seated position against the spring housing once counter-rotation occurs and the activation pin attached to the valve closure member is drawn away from the spring nut engagement member in the receptacle. The disk-like spring nut situated at one end of the spring near the open end of the spring housing, has a cutout pattern that assists alignment of the spring nut engagement member with the tip of the activation pin for even lifting and reseating of the valve closure member against the spring housing. One contemplated application of the dispensing system herein is by manufacturers of equipment requiring periodic renewal of dry and liquid materials for their operation to limit the supply source of such materials.

BACKGROUND—DESCRIPTION OF PRIOR ART

For most industrial and commercial dispensing applications, a spill-free transfer of liquid and dry materials from a holding container to a receiving vessel is desired. When a spill-free transfer is attempted by hand, typically the holding container for the material to be dispensed is at least partially inverted by the operator to initiate gravity-assisted flow of the material into the receiving vessel. The receptacle into which the gravity-assisted flow of material is directed can be on the top of the receiving vessel, or on a vertical surface near to the receiving vessel's upper surface. If it is left up to the operator to uncover the dispensing opening on the holding container and simply align it with the receptacle in the receiving vessel while upending the holding container, spills will undoubtedly occur. Even if a dispensing cap were used that restricted the size of the dispensing opening during upending, or aligned it with the receptacle while the operator held it close to or against the top of the receptacle during the entire period of material transfer, it is still expected that occasional spills would occur. Also, if the entire contents of the holding container does not need to be transferred, it would be difficult to right the holding container without spilling at least a little of the non-transferred material. The best means for spill-free gravity-assisted transfer of dry or liquid material from an inverted holding container into a stably positioned receiving vessel would involve a dispensing cap that did not allow transfer of material to begin until the dispensing cap was firmly secured to the receptacle in the receiving vessel, a dispensing cap that could stand alone in a locking type of engagement with the receptacle in the receiving vessel, without operator support during material transfer, and a dispensing cap that could be manipulated to block transfer of any material remaining in the holding container immediately prior to disengagement of the dispensing cap from the receptacle. The present invention provides all of these advantages, and further provides the advantage of its bottle cap assembly having a spring nut with a cutout pattern that only allows engagement with a paired receptacle having a spring nut engagement member with a specific and complementary configuration. Thus, the source of replacement materials added to a receiving vessel could be controlled and limited to only those materials in holding containers fitted with dispensing cap assemblies that are configured for full insertion within the receiving vessel's receptacle and interaction with the receptacle's spring nut engagement member to initiate material flow.

The prior art thought to be the most closely related to the present invention is the invention disclosed in U.S. Pat. No. 5,960,840 to Simmel (1999). The Simmel invention is also a locked product-dispensing valve assembly. However, there are important differences between the present invention and the Simmel invention, a significant one being that the Simmel product-dispensing valve assembly is not inserted completely within its paired tank adapater, as can be seen in FIGS. 4 and 29. The portion of the Simmel invention attached to the dispensing container has a substantially cylindrical housing with a lower flat plate portion that includes circumferential protrusions in the form of locking fins or tabs. The inside of the cylindrical housing contains the lower half of a cam track and its outer surface contains a circumferential ledge. Also, on the inside surface of the cylindrical housing, between the cam track and the flat plate portion, there is a beveled zone. The upper surface of the cam track is provided by an insert positioned within an adapter having a radially extending flange on its lower edge that engages the circumferential ledge on the cylindrical housing. The insert, adapter, and cylindrical housing are secured to a product container with a threaded retaining ring. A pivot valve member is positioned within the combination formed by the concentric cylindrical housing, adapter, and insert. The pivot valve member has a lower sealing disk and upper fins that move within the cam track, the pivot valve member being rotatable relative to the cylindrical housing. When the pivot valve member is in a closed position relative to the cylindrical housing, the sealing disk rests against the beveled edge. To activate the Simmel product valve dispensing assembly, and move the sealing disk away from the beveled zone, the upper fins would be rotated along the cam track until reaching its end, further movement thereafter becomes longitudinal to create a gap between the sealing disk and the beveled zone. To accomplish the longitudinal displacement that activates product-dispensing, the Simmel product-dispensing valve assembly is mated with and locked to a dilution tank adapter so that an activation pin on the tank adapter becomes inserted into a receiving zone within the lower part of the pivot valve member. The Simmel tank adapter has a cylindrical base with a centrally positioned upstanding activation pin, a flange outwardly extending from its open end, notches between the base and the flange to accommodate each of the tabs on the flat plate portion of the cylindrical housing in its product-dispensing valve assembly, and channels associated with the notches so that each channel has an open end at the notch and a opposed end terminating at an abutment stop. Once the tabs on the flat plate portion of the cylindrical housing of the Simmel product-dispensing valve assembly are inserted into the notches, the tabs are projected downwardly into the channels whereafter a rotational movement places each tab against a different one of the abutment stop and locks the product-dispensing valve assembly to the tank adapter. As the tabs move downwardly into the channels, the upstanding activation pin in the tank adapter becomes positioned within the receiving zone in the pivot valve member which allows the receiving zone and attached pivot valve member to be drawn downwardly away from the stationary cylindrical housing so that a product-dispensing gap is formed between the sealing disk adjacent to the receiving zone and the beveled zone on the cylindrical housing adjacent to the flat plat portion from which the tabs outwardly depend. In contrast, although having an overall function similar to that of the Simmel invention, the construction of the present is different, less complex, and reversed in part from the Simmel invention. While the Simmel invention has circumferential tabs on the flat plate portion of the cylindrical housing in its product-dispensing valve assembly which each engage a corresponding notch in its tank adapter for locking engagement between the product-dispensing valve assembly and the tank adapter, the present invention uses one or more protrusions attached to the inside surface of its receptacle that engage the notches in the bottom rim of its associated bottle cap member. Also, the bottle cap member of the present invention, upon which its valve closure member is seated, is made from a unitary construction, while the product-dispensing valve assembly, to which the pivoting valve member of the Simmel invention is engaged, comprises a four-piece unit consisting of a cylindrical housing, a threaded retaining ring, an adapter, and an insert concentric within the adapter. Further, the pivoting valve member of the Simmel invention has a different structure than the valve closure member of the present invention. The Simmel pivoting valve member has fins on one of its ends, a sealing disk on its opposed end, and a central receiving zone within the end of the pivoting valve member that is connected to the sealing disk. In contrast, the valve closure member of the present invention has a substantially cylindrical main body with one open end, an outwardly directed flange adjacent to the open end, and an activation pin centrally connected to the inside surface of the closed end and extending through the main body and beyond the open end, with the outer edge of the flange having a slight amount of curvature away from the closed end. In the present invention, the lifting of the valve closure member away from its spring housing valve seat to allow material flow through small holes at the base of the spring housing, is caused by the top of the spring nut engagement member that is attached within the dispensing opening in the receptacle connecting with the tip of the activation pin of the valve closure member and exerting a force on it while the activation pin is centered within a coil spring positioned within the spring housing and secured in the central position in the spring housing by a spring nut. In contrast, product flow in the Simmel invention is activated when a gap is created between the sealing disk on one end of the pivoting valve member with a beveled zone adjacent to the flat plate portion of the cylindrical housing. To create that gap, the upstanding activation pin attached to the bottom inside surface of the tank adapter, and having an upper surface with a configuration complementary to the receiving zone in the base of the pivoting valve member, must engage the receiving zone. Also, the fingers on the other end of the pivoting valve member must be inserted within the cam track formed in part by the cylindrical housing, whereafter when the locking tabs depending circumferentially from the flat plate portion of the cylindrical housing adjacent to the beveled zone are aligned with notches in the upper wall of the tank adapter and movement in both rotational and longitudinal directions is exerted upon the cylindrical housing, the fingers of the pivoting valve member follow the cam track which causes the sealing disk to be withdrawn from the beveled zone at the position in the cam track corresponding to the abutment stop. Although both Simmel and the present invention use a combination of longitudinal and rotational movement to lock a cap to a receptacle, the Simmel invention uses rotation of its pivoting valve member along the cam track, followed by a longitudinal movement of its combination cap toward the tank adapter to release product into its tank adapter, while in contrast the present invention uses rotation of the bottle cap member to align the protrusion on the inside receptacle wall with a notch, longitudinal movement of the entire cap assembly relative to the receptacle so that the protrusion moves through the notch and into a horizontally extending channel, followed by further rotational movement of the bottle cap assembly relative to the receptacle to move a stop secured within the channel into contact with the protrusion, and thus lock the bottle cap assembly and the receptacle together for secure spill-free transfer. When the receptacle is attached to a stably positioned docking station, material transfer can proceed hands-free once the bottle cap assembly is locked to the receptacle. It is the longitudinal movement of the bottle cap assembly in the present invention that brings the top of the spring nut engagement member sufficiently into contact with the tip of the activation pin to lift the valve closure member a short distance above the spring housing so that the small holes adjacent to the base of the spring housing are revealed and made available for material transfer. The present invention has a simpler design than the Simmel invention, and is less expensive and easier to manufacture. There is no dispensing cap system known that has the same construction as the present invention, nor one that has all of its advantages.

SUMMARY OF INVENTION—OBJECTS AND ADVANTAGES

The primary object of this invention is to provide a dispensing cap system that allows spill-free transfer of liquid and dry material from an inverted holding container into a receiving vessel. It is a further object of this invention to provide a dispensing cap system that allows hands-free material transfer once its dispensing cap assembly is locked into its corresponding receptacle and while the receptacle is attached to a balanced and stable docking station. It is also an object of this invention to provide a dispensing cap system that prevents material flow from the inverted holding container prior to the engagement of its dispensing cap assembly with the targeted receptacle, and blocks flow of any material remaining in the inverted holding container as it is lifted from the receptacle after material transfer. A further object of this invention is to provide a dispensing cap system that can be used to limit the source of material transferred spill-free into the receiving vessel. It is also an object of this invention to provide a dispensing cap system that has a relatively simple design for cost-effective manufacture, so that the dispensing cap assembly can be optionally discarded or recycled after use. A further object of this invention is to provide a dispensing cap system that is easy to use and can be easily cleaned between uses when it is desired to do so prior to reuse.

As described herein, properly manufactured and used, the dispensing cap system of the present invention has a dispensing cap assembly that can be attached by threaded engagement to the neck around the transfer opening of a holding container for liquid or dry material, is completely separable from its paired receptacle, and restricts transfer of the dry or liquid material from the holding container while it is in a fully or partially inverted position until, and only when, the dispensing cap assembly is in close association with its paired receptacle. Thus, material transfer from the holding container into a receiving vessel attached to a paired receptacle is always spill-free. Material transfer through use of the present invention is also hands-free when the targeted receptacle is installed securely within a receiving vessel that is configured and dimensioned for balanced and stable positioning while the holding container is positioned above it in an inverted transfer position, and in locked connected with the receptacle. The receptacle can be attached to the top surface of a receiving vessel, or to a vertical or near vertical surface of the receiving vessel near to its top end. To initiate gravity-assisted material flow, once the dispensing cap assembly of the present invention is attached to a holding container, the holding container is inverted at least in part, and the entire dispensing cap assembly, including its vertically ridged outside surface, is inserted within the receptacle and the protrusion attached to the inside receptacle wall is aligned with a notch in the bottom rim of the bottle cap member so that it can enter the side channel spaced apart from and below the vertically ridged outside surface of the bottle cap member, the holding container can be rotated so that the protrusion follows the side channel until the protrusion abuts against a stop in the channel that is centrally positioned between the two notches. With the protrusion in a position adjacent to the stop, the dispensing cap assembly is in a position of locking engagement with its corresponding receptacle, which cannot be released until the dispensing cap assembly is again rotated relative to the receptacle and the protrusion is again aligned with a notch in the bottom rim. Until the protrusion on the receptacle is inserted beyond a notch on the bottom rim, the valve closure member in the dispensing cap assembly remains in its closed position against the outer surface of the spring housing, where it covers the small holes adjacent to the base of the spring housing used for material transfer, preventing any transfer of material from an associated inverted holding container. As the protrusion is pushed beyond the notch and into the side channel of the bottle cap member, the spring nut engagement member in the dispensing opening of the receptacle is placed in contact with the tip of the activation pin whereby the valve closure member is fractionally lifted from its closed position against the spring housing to provide fluid communication between the interior of an associated inverted holding container and the small holes adjacent to the outside surface of the spring housing, thus allowing material transfer into the receptacle to begin. The dry or liquid material in the associated holding container then enters the receptacle, and gravity moves it downward toward the flukes on the outside surface of the spring nut engagement member that is secured within the discharge opening in the central bottom portion of the receptacle, whereafter the material flows between the flukes and through the discharge opening to enter the transfer opening in a receiving vessel. In the alternative, the material transfer can be made into tubing or a chute connected to the receiving vessel. In the reverse, material transfer is terminated prior to disengagement of the bottle cap member from the receptacle, as the withdrawal of the bottom rim beyond the protrusion on the inside surface of the receptacle causes separation of the spring nut engagement member from the tip of the activation pin, allowing the valve closure member to again assume its closed position blocking the small holes near to the base of the spring housing used for material flow from the inverted holding container to the receiving vessel. Since the material flow is blocked prior to material transfer, and terminated prior to separation of the bottle cap member from the receptacle after the amount of required dispensing occurs, no spilled liquid or dry material is possible at any time. Between material transfers, a dust cap can be placed over the upper opening in the receptacle to prevent unwanted objects or other materials from entering the interior of the receptacle. Also, since only a spring nut engagement member having an outer surface design configured for engaging the cutout pattern in the spring nut can reach the tip of the activation pin to lift the valve closure member from the outer surface of the spring housing and thereby initiate material transfer, the source of materials placed spill-free into the receptacle is limited to a dispensing cap assembly having the specific indicated design. Further, the dispensing cap system of the present invention is relatively simple in design, which makes it cost-effective to manufacture, disposable in appropriate applications, easy to use, and easily cleaned between uses when reuse is desired. The dispensing cap assembly of the present invention includes a bottle cap member with an arcuate internally-threaded open end configured for attachment to the male threads on the holding container from which a quantity of fluid or dry material must be transferred, as well as a substantially sealed end, and stepped interior walls with obtuse angles between adjacent risers. The bottle cap member further has a substantially cylindrical hollow spring housing centered within its sealed end and a small notch on a narrow ridge adjacent to the sealed end. The spring housing performs the function of a valve seat, has a small central aperture on the one of its ends positioned to face the threaded open end of the bottle cap, and also has a plurality of spaced-apart slots on its outer surface that each lead downwardly to a small hole through the closed end of the bottle cap member, and its other end being open for receipt of a coil spring. The receptacle of the present invention to which the bottle cap member becomes locked during dry or fluid material transfer into a reservoir or receiving vessel within a docking station includes a substantially cylindrical receptacle housing having an open top end, a radially extending flange adjacent to the top end, a discharge opening centrally within its bottom end, a hollow interior with stepped walls that decrease in diameter toward the bottom end, one substantially rectangular protrusion inwardly depending from the upper end of the middle interior wall, and a spring nut engagement member secured within the discharge opening. The spring nut engagement member has upper surfaces configured for partial insertion through a particular cutout pattern in the spring nut positioned at the open end of the spring housing, as well as a plurality of spaced-apart flukes radially extending from the middle and lower portions of its outside surface, with each fluke having a downwardly sloping upper surface. In addition, the flange outwardly depending from the receptacle housing provides a connection means for attachment to the docking station exterior, as well as a connection means for the attachment of a removable dust cap. Thus, when a substantially cylindrical valve closure member having a main body with a hollow interior, a closed end, and an open end, a radially extending flange adjacent to its open end, and an activation pin centrally connected to the interior surface of the closed end that downwardly extends beyond its open end, is seated upon the spring housing of the present invention with its activation pin inserted through the central aperture in the upper end of the spring housing, and a spring is connected between the upper interior surface of the spring housing and a spring nut having a particular cutout pattern so that the spring nut becomes positioned adjacent to the lower open end of the spring housing, only a receptacle housing having a spring nut engagement member with an upper surface allowing engagement with the cutout pattern in the spring nut will be able to lift the valve closure member from its spring housing valve seat and allow transfer of liquid or dry material into the targeted reservoir or receiving vessel within the docking station. Further, to lock the holding container to the reservoir and permit spill-free transfer of dry or liquid material therebetween, the protrusion on receptacle must be aligned with the bottle cap notch and a bayonet turn applied to the bottle cap to both pivot it relative to the receptacle as well as move it longitudinally toward the receptacle, before the valve closure member can be sufficiently unseated from the spring housing to allow material transfer. The dispensing system of the present invention has a simple design when compared to the prior art and can be used by manufacturers of equipment requiring periodic replacement of dry and liquid products to limit the source of those products. No dispensing cap system is known with all of the features and advantages of the present invention.

The description herein provides preferred embodiments of the present invention but should not be construed as limiting the scope of the dispensing cap system. For example, variations in the size and configuration of the cutout pattern in the spring nut; the size, number, and configuration of the small holes adjacent to the spring housing; the number of coils in the spring; the configuration, number, and size of the vertically extending slots in the spring housing; the material from which the spring nut is made; the size and configuration of the protrusion on the inside wall of the receptacle, the thickness of the narrow ridge on the bottle cap member into which the notch for the protrusion is made; the type of attachment means used to secure the receptacle to the receiving vessel; the number of attachment pins used when attachment pins provide at least part of the attachment means between the receptacle and the receiving vessel; and the length and diameter of the activation pin depending from the main body of the valve closure member; other than those shown and described herein may be incorporated into the present invention. Thus, the scope of the present invention should be determined by the appended claims and their legal equivalents, rather than the examples given.

BRIEF DESCRIPTION OF THE DRAWINGS

FIG. 11 is a sectional view of the preferred embodiment of the present invention bottle cap system having a dispensing bottle cap assembly connected to a targeted docking station receptacle, with the bottle cap assembly having a bottle cap member, a spring housing attached to the sealed end of the bottle cap member, a spring-biased valve closure member seated upon the spring housing with an activation pin inserted through an upper opening in the spring housing and the valve closure member positioned so as to prevent material transfer, and the bottle cap assembly also having a disk-like spring nut attached to the lower end of the spring, with the targeted docking station receptacle having a housing with an upper flange, attachment pins downwardly depending from the flange, a bottom discharge opening, and an upwardly tapering spring nut engagement member within the discharge opening and having an upper surface configured for insertion through the cutout pattern in the spring nut, and the bottle cap system also having a dust cap employed for sealing the upper opening in the receptacle housing between material transfers with the dust cap being attached to the flange but in an unsealed position.

DETAILED DESCRIPTION OF PREFERRED EMBODIMENTS

Figures 1, 2:
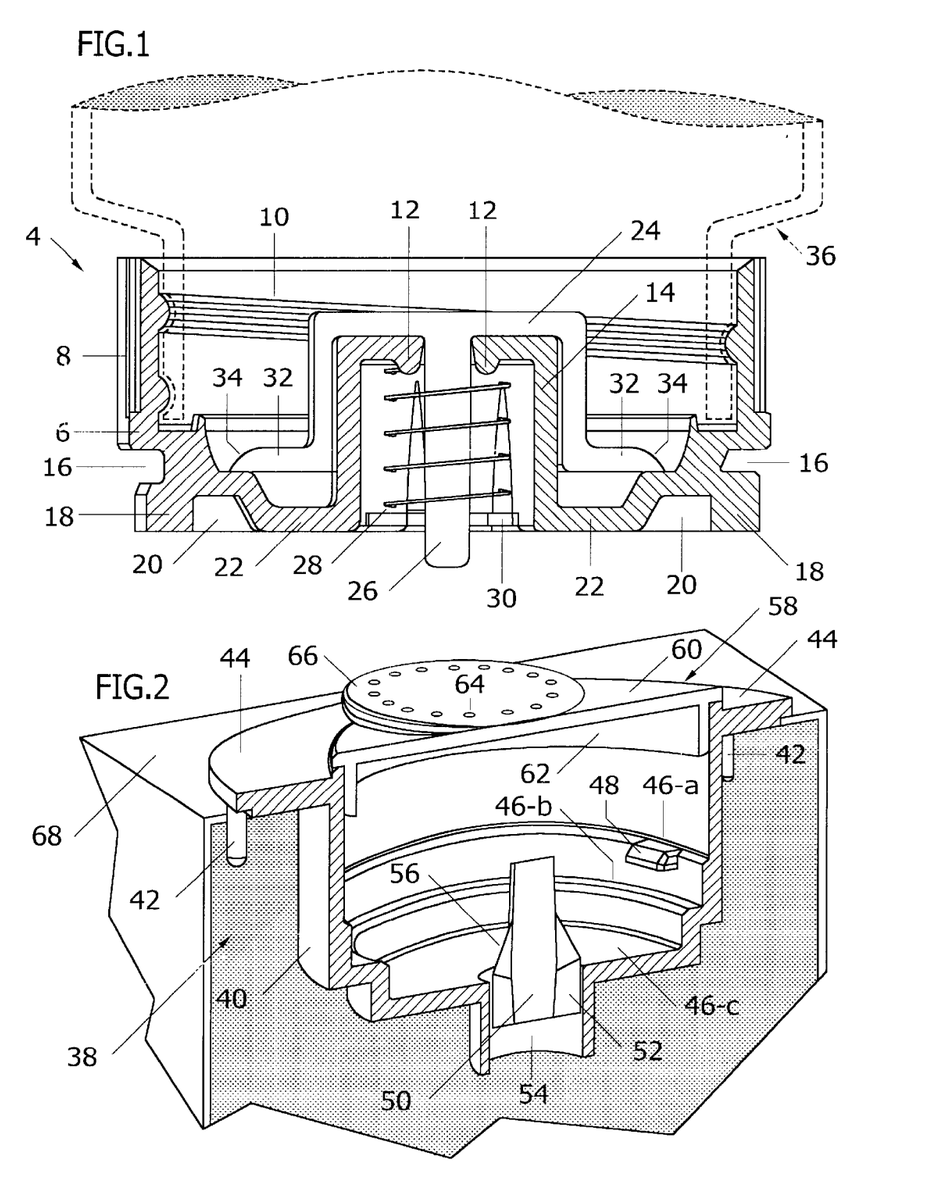
FIG. 1 is a sectional view of the preferred embodiment of the present invention dispensing bottle cap assembly having a bottle cap member, a spring housing attached to the sealed end of the bottle cap member, a valve closure member seated upon the spring housing with an activation pin inserted through an upper opening in the spring housing, a disk-like spring nut positioned at the lower open end of the spring housing, and a spring positioned within the spring housing between the spring nut and the opening in the upper end of the spring housing.
FIG. 2 is a sectional view of the preferred embodiment of the present invention targeted docking station receptacle having a housing with an upper flange, attachment pins downwardly depending from the flange, several stepped interior walls, a substantially rectangular protrusion attached to the inside wall surface of the housing, a bottom discharge opening, an upwardly tapering spring nut engagement member secured within the discharge opening that has an upper surface configured for partial insertion through the cutout pattern in the spring nut, and also having a dust cap sealing the upper opening in its housing.
Figure 11:
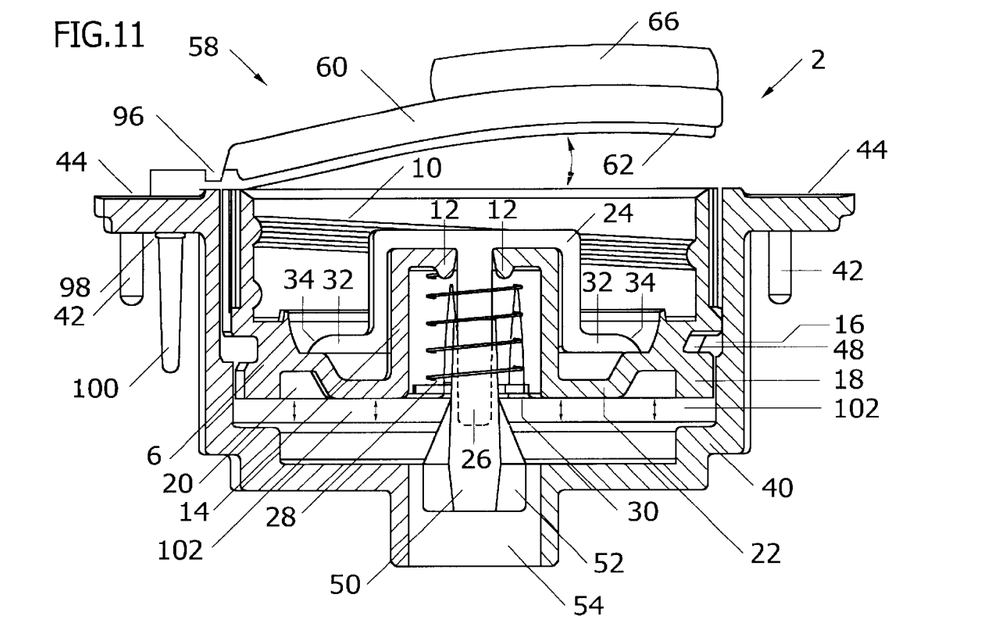
Figure 12:
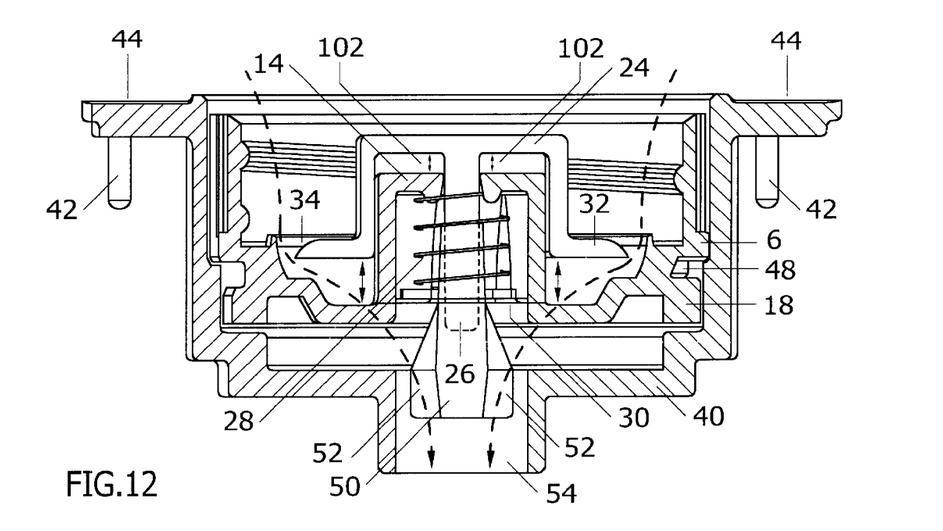
FIG. 12 is a sectional view of the preferred embodiment of the present invention bottle cap system with the spring-biased valve closure member raised into an open position allowing material transfer, with the broken lines showing the anticipated direction of material flow.

The present invention comprises a dispensing bottle cap system 2 that can be used for the transfer of fluid and dry materials alike, which comprises a dispensing bottle cap assembly 4 having a spring-biased valve closure member 24 that can be used to allow gravity-assisted material flow from an inverted holding container, such as that shown in FIG. 1 by the number 36, into a receptacle 38 attached to a docking station, such as docking station 68 in FIG. 2 or other receiving vessel (not shown), and further allow such material flow only when the dispensing bottle cap assembly 4 is in close association with a targeted receptacle 38 that is specifically configured for exclusive reception of dispensing bottle cap assembly 4. To place holding container 36 in locked engagement with receptacle housing 40 and permit hands-free gravity-assisted transfer of material between holding container 36 and docking station 68, the protrusion 48 on the inside surface of receptacle housing 40 must be aligned with one of the bottle cap notches 70 and a bayonet turn applied to holding container 36 to move the bottle cap member 6 longitudinally toward receptacle housing 40, as well as pivot bottle cap member 6 relative to receptacle housing 40, before the valve closure member 24 is sufficiently unseated from the outer surface of spring housing 14 to allow material transfer. FIG. 1 shows dispensing bottle cap assembly 4 attached to an inverted holding container 36, while FIG. 2 shows receptacle 38 positioned within the upper surface of a docking station 68. The bottle cap member 6, valve closure member 24, spring 28, and disk-like spring nut 30, which are all components of dispensing bottle cap assembly 4, are shown respectively in FIGS. 3–7. In addition, FIGS. 8–9 respectively show receptacle 38 and the spring nut engagement member 50 permanently connected within the discharge opening 54 in receptacle 38, while FIG. 10 shows the dust cap 58 that can be employed over the upper opening in receptacle 38 between material transfers. In FIG. 11, dispensing bottle cap system 2 is partially assembled, whereas it is fully assembled in FIG. 12. FIG. 11 shows dispensing bottle cap assembly 4 partially inserted within receptacle housing 40 prior to the bayonet turn that would lock bottle cap member 6 to receptacle 40, with a gap 102 existing between the central bottom surface 22 of bottle cap member 6 and the bottom inside surface of receptacle housing 40. Also, in FIG. 11, valve closure member 24 remains in a closed position against the top surface of spring housing 14 so as to prevent material flow. In contrast, FIG. 12 shows dispensing bottle cap assembly 4 fully inserted within receptacle housing 40, after the bayonet turn has been made that locks dispensing bottle cap assembly 4 to receptacle housing 40, with the central bottom surface 22 of bottle cap member 6 being fully positioned against the bottom inside surface of receptacle housing 40, so that gaps 102 now exist between valve closure member 24 and the top surface of spring housing 14, as well as between the outer edge 34 of the flange 32 outwardly depending from valve closure member 24 and the inside surface of bottle cap member 6. In such a position, FIG. 12 shows valve closure member 24 in an open configuration that allows material flow from an inverted holding container 36 attached to dispensing bottle cap assembly 4, all the way through a receptacle 38 specifically configured to receive dispensing bottle cap assembly 4 and become securely locked to it, and into a receiving vessel (not shown) within a docking station 68.

FIG. 1 shows the most preferred embodiment of the present invention dispensing bottle cap assembly 4 having a bottle cap member 6 connected around the neck of an inverted holding container 36. FIG. 1 shows bottle cap member 6 having an arcuate open upper end and spiral threads 10 on its inside surface configured for connection to a complementary pattern of threads (not shown) on the type of holding container 36 intended for use with dispensing bottle cap assembly 4 and from which a quantity of fluid or dry material (not shown) would be transferred. FIG. 1 also shows bottle cap member 6 having a substantially sealed end in a position opposed from its open upper end, of which an upwardly depending spring housing 14 is an important part. The most preferred embodiment of dispensing bottle cap assembly 4 further has stepped interior walls with obtuse angles between each riser and the next adjacent horizontally extending surface below. The openings in the substantially sealed end of bottle cap member 6, which are not shown in FIG. 1, include a plurality of small holes, shown by the number 74 in FIGS. 3 and 4, which are spaced apart from one another and positioned around the base of spring housing 14, and the central opening, shown in FIG. 3 by the number 76, through the top surface of spring housing 14 and through which the activation pin 26 of valve closure member 24 is inserted during material transfer use. Spring housing 14 is hollow and substantially cylindrical in configuration with a small downwardly depending circular ridge 12 on its inside upper surface, adjacent to central opening 76. Circular ridge 12 maintains the upper end of spring 28 in a substantially centered position within spring housing 14 during material transfer use. FIG. 1 shows spring housing 14 substantially centered within the sealed end of bottle cap member 6, the central bottom surface around spring housing 14 being identified by the number 22, and an outer bottom rim 18 of bottle cap member 6 being separated from central bottom surface 22 by a circular bottom channel 20. Bottom rim 18 is also separated from the ribbed outer surface 8 on the upper portion of bottle cap member 6 by a circular side channel 16. Two opposing notches 70, not shown in FIG. 1 but illustrated in FIG. 4, are located through bottom rim 18. Notches 70 are configured and dimensioned to permit entry of the substantially rectangular protrusion 48 into side channel 16 so that locked engagement between dispensing bottle cap assembly 4 and receptacle 38 can be achieved when dispensing bottle cap assembly 4 is rotated relative to receptacle 38 and rectangular protrusion 48 no longer remains positioned near to either notch 70. Although not shown in FIG. 1, but shown in FIG. 4, bottle cap member 6 has a stop 78 positioned within channel 16 centrally between notches 70. Thus, when dispensing bottle cap assembly 4 is rotated relative to receptacle 38 so that rectangular protrusion 48 engages stop 78, the bottle cap system 2 of the present invention is in its fully locked position.

FIG. 1 also shows a valve closure member 24 positioned against the upper surface of spring housing 14, and in close proximity to the outside side surfaces of spring housing 14.

Thus, spring housing 14 performs the function of a valve seat for valve closure member 24. FIG. 1 further shows valve closure member 24 having an outwardly extending lower flange 32, with a downwardly arcuate outer edge that engages the upper surface of one of the risers in the stepped interior wall of bottle cap member 6. In addition, FIG. 1 shows an activation pin 26 downwardly depending from the inside central surface of valve closure member 24 with its distal end being inserted through and connected to a disk-like spring nut 30. During its engagement with spring housing 14, activation pin 26 extends through the central opening 76 in the top surface of spring housing 14, central opening 76 being more clearly revealed in FIG. 3. FIG. 1 also shows activation pin 26 centered within a spring 28, with spring 28 extending between disk-like spring nut 30 and circular ridge 12. Spring 28 biases valve closure member 24 into its closed position against the top surface of spring housing 14, until bottle cap member 6 is moved longitudinally into contact with receptacle housing 40 whereby the tapering upper surfaces 56 of spring nut engagement member 50, as shown in FIG. 2, becomes partially inserted through the cutout pattern 84 in disk-like spring nut 30, shown in FIG. 6, and the top of spring nut engagement member 50, shown in FIG. 9 by the number 92, is permitted by disk-like spring nut 30 and spring 28 to push sufficiently against the tip of activation pin 26 to lift valve closure member 24 a fractional distance away from the top surface of spring housing 14. The compressed energy in spring 28 then causes valve closure member 24 to return to its closed position against spring housing 14, when dispensing bottle cap assembly 2 is removed from receptacle 38. The number of coils present in spring 28 is not critical, nor is the thickness dimension of disk-like spring nut 30 as long as each can effectively perform the function for which it was designed. Also, the diameter of the material used for spring 28 can vary in different applications. The diameter of spring housing 14 is also variable, but must allow ample clearance for movement of disk-like spring nut 30 and spring 28 within its hollow interior. The diameters of activation pin 26 and the central opening 76 in the upper surface of spring housing 14 can also vary in size, as long as the diameter of central opening 76 remains sufficiently large to allow easy movement of activation pin 26 therethrough without undue friction and wear. The number, size, and configuration of spiral threads 10 can also vary, as long as they provide complementary engagement with threads (not shown) on the outside neck surface of holding container 36. The thickness is valve closure member 24 is also not critical, as long as it has a minimum thickness dimension that allows it sufficient rigidity to permit material flow without the material of valve closure member 24 buckling or folding under the weight of the dry or liquid substance stored in holding container 36 as it begins to flow. Further, the pattern in the ribbed outer surface 8 of bottle cap member 6 is not critical, and need only to provide an easily-gripped surface for the hand of the person attempting to connect it to holding container 36. The thickness dimension of the material used for bottle cap member 6 should provide for a sturdy construction of bottle cap member 6. However, for cost-effective manufacturing the thickness of bottle cap member 6 should not be increased above or below the levels at which an appropriate benefit is no longer derived.

Although material used for manufacture can vary, it is contemplated for bottle cap member 6 in the most preferred embodiment of bottle cap 2 to be made from plastic materials and have a unitary molded construction. Valve closure member 24 in the most preferred embodiment can be made from the same plastic material used for bottle cap member 6, or from a different material 1. For extended, trouble-free use, it is also contemplated for valve closure member 24 to have a unitary molded construction. It is further contemplated in the most preferred embodiment for coil spring 28 to be made from non-corroding, non-toxic materials, such as stainless steel, and for disk-like spring nut 30 to be made from either plastic or metal materials. Particularly when it is intended for food or ingestible liquids to be transferred from holding container 36 to receptacle 38, all materials should be non-reactive and non-toxic. The size of holding container 36 relative to dispensing bottle cap assembly 4 is not critical, and does not have to be limited to that shown in FIG. 1. However, when hands-free transfer of material from holding container 36 to receptacle 38 is desired once dispensing bottle cap assembly 4 is locked in relation to receptacle housing 40, the shape of any holding container 36 connected to bottle cap member 6 must allow it to be inverted in a substantially symmetrical position over receptacle housing 40 for proper balance. While it is contemplated for dispensing bottle cap assembly 4 to be made from materials that can be easily cleaned between uses so as to be repeatedly reusable, it is also contemplated when dictated by the application, for dispensing bottle cap assembly 4 to be cost-efficiently produced and made from recyclable materials, so that it can be discarded or recycled.

FIG. 2 shows the preferred embodiment of the present invention targeted receptacle 38 for connection with dispensing bottle cap assembly 4, secured within the upper surface of a docking station 68. The size of receptacle 38 relative to docking station 68 is not critical, and does not have to be limited to that shown in FIG. 2. In addition, connection of receptacle 38 should not be limited to the upper surface of a docking station 68, and can be connected to a side surface of a receiving vessel such as docking station 68, as long as discharge opening 54 is positioned in a superior position relative to the opening in the chamber or reservoir into which it will ultimately be stored for gravity-assisted flow. FIG. 2 shows receptacle 38 having a receptacle housing 40 that is substantially cylindrical, with an outwardly extending upper flange 44 adjacent to its top open end and opposing attachment pins 42 downwardly depending from the lower surface of upper flange 44. The radially extending flange 44 provides a connection means for attachment of receptacle housing 40 to a receiving vessel or docking station 68, as well as a connection means for hinged operation of a dust cap 58 over the top open end of receptacle housing 40 between periods of material transfer use. It is not critical for attachment pins 42 to be used for the connection of receptacle housing 38 to docking station 68, and any secure means can be used that allows receptacle housing 38 to remain stationary relative to docking station 68 when a bayonet turn is applied to dispensing bottle cap assembly 4 to lock it in place against the interior surface of receptacle housing 40. Also, when attachment pins 42 are used, they are not limited in size, configuration, or number to the two opposing attachment pins 42 shown in FIG. 2. In the most preferred embodiment of bottle cap system 2, it is contemplated for approximately six or seven attachment pins 42 to be used. FIG. 2 also shows receptacle housing 40 having a top open end and a hollow interior with several stepped interior surfaces 46a–c decreasing in diameter toward its bottom end, with a substantially rectangular-shaped protrusion 48 inwardly depending from the inside wall surface of the receptacle housing 40 between the uppermost stepped interior surface 46a and the middle stepped interior surface 46b. Although the most preferred embodiment of the present invention bottle cap system 2 would have a single protrusion 48 within receptacle housing 40 for more cost-effective manufacture, it is also considered to be within the scope of bottle cap system 2 to have more than one protrusion 48. FIG. 2 further shows receptacle housing 40 having a discharge opening 54 centrally within its bottom end and a spring nut engagement member 50 permanently mounted within discharge opening 54, with the middle and lower portions of spring nut engagement member 50 having several spaced-apart flukes 52 radially extending form its outside surface and each fluke 52 ending in an upwardly tapering surface 56. The configuration of upwardly tapering surface 56 limits the type of dispensing bottle cap assembly 4 that can be locked within receptacle housing 40 and initiate material transfer through discharge opening 54, to a dispensing bottle cap assembly 4 containing a spring nut 30 with a cutout pattern 84 that complements upwardly tapering surface 56. Should upwardly tapering surface 56 not be able to become partially inserted with cutout pattern 84 prior to a locking bayonet turn being applied to bottle cap member 36 to lock it within receptacle housing 40, as the bayonet turn is applied the spring nut engagement member 50 will not advance sufficiently forward within bottle cap member 6 to contact the tip of actuation pin 26 and cause valve closure member 24 to be lifted away from the upper surface of spring housing 14, and material flow will not occur. Thus, manufacturers of equipment requiring frequent replacement of dry and liquid products can used dispensing system 2 to limit the source of those products. The number of flukes 52 on spring nut engagement member 50 is not critical, but should not be so numerous as to impede the flow of material through discharge opening 54. In the most preferred embodiment of bottle cap system 2 it is contemplated for four flukes 52 to be employed.

FIG. 2 further shows a dust cap 58 sealing the upper open end of receptacle housing 40. The main body 60 of dust cap 58 is in a position raised above upper flange 44, with lower rim 62 extending downwardly a short distance within the top open end of receptacle housing 40. The hinged end of dust cap 58 that is shown in FIG. 10 is not visible in FIG. 2, and in the most preferred embodiment of present invention bottle cap system 2 the hinged end would comprise a single attachment post 100, a concave hinge member 96, and a retaining ring 98 on attachment post 100 near to hinge member 96 which helps to retain attachment post 100 within the attachment hole 90 in upper flange 44 that is shown in FIG. 8. FIG. 2 shows the end of dust cap 58 remote from its hinged end having a front raised portion 66 that improves the grip of an operator's hand on dust cap 58 during removal of dust cap 58 from the upper opening in receptacle housing 40. The configuration of front raised portion 66 can be any shape that is aesthetically pleasing and easily manipulated by an operator's hand. FIG. 2 also shows a plurality of raised circular protrusions 64 on the top surface of front raised portion 66. Although raised circular protrusions 64 are mainly decorative, they can also be configured to assist in an improved operator grip for easy lifting of dust cap 58 away from receptacle 38 or replacing dust cap 58 within the upper opening on receptacle housing 40 between material flow use. In the most preferred embodiment of bottle cap system 2, it is not contemplated for raised portion 66 to be separable from main body 60. When docking station 68 has a balanced and stable configuration, hands-free material transfer can occur after dispensing bottle cap assembly 4 is locked into receptacle housing 40 with a bayonet turn.

Figure 3:
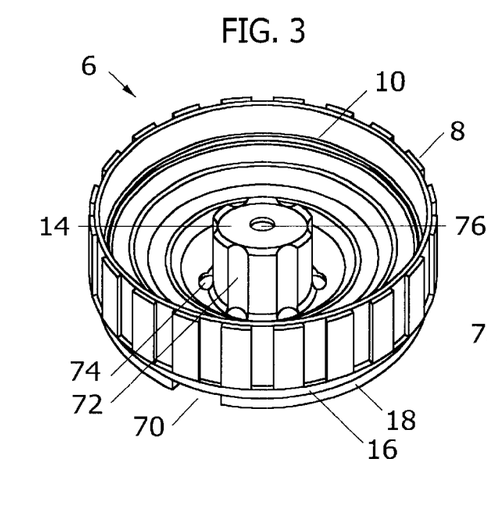
FIG. 3 is a perspective top view of the preferred embodiment of the present invention bottle cap member having a ribbed outer surface, a spirally threaded inner surface, a central spring housing upwardly depending from its lower sealed end, a bottom rim, a side channel adjacent to and above the bottom rim, a notch through the bottom rim, with its spring housing also having a central aperture through its top surface, several slots through its outside surface, and a small hole at the lower end of each slot.
Figure 4:
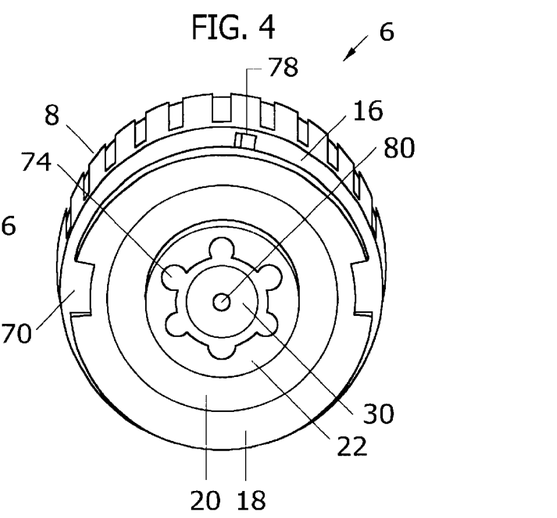
FIG. 4 is a perspective bottom view of the preferred embodiment of the present invention bottle cap member having a ribbed outer surface, a bottom rim, a side channel adjacent to and above the bottom rim, two opposing notches through the bottom rim, and a stop positioned within the channel centrally between the notches, with the tip of the activation pin attached to the springbiased valve closure member centrally visible through the bottom of the bottle cap member, the disk-like spring nut visible around the activation pin, and the small holes at the lower end of the slot in the spring housing being visible around the spring nut.

FIG. 3 shows the most preferred embodiment of the present invention bottle cap member 6 having a substantially cylindrical configuration, an arcuate open upper end, and a central spring housing 14 upwardly depending from its lower substantially sealed end. Bottle cap member 6 ribbed outer surface 8 adjacent to its open upper end and an inner surface with spiral threads 10. FIG. 3 also shows a side channel 16 adjacent to the lower end of bottle cap member 6, an outer bottom rim 18 adjacent to and below side channel 16, and a notch 70 through outer bottom rim 18. In addition, FIG. 3 shows spring housing 14 having a central opening 76 through its top surface, several spaced-apart and vertically-extending slots 72 through in its outside surface, and each slot 72 communicating at its lower end with a small hole 74 at the base of spring housing 14. The configuration of ribbed outer surface 8 is not critical, and not limited to that shown in FIG. 3. However, the configuration of ribbed outer surface 8 must be one that is easily gripped by an adult human hand for prompt attachment or removal of bottle cap member 6 from holding container 36. Also, spiral threads 10 can have any configuration that securely connects bottle cap member 6 to the neck of a targeted holding container 36 and provides a leak-proof connection therebetween. The notch 70 through outer bottom rim 18 must be dimensioned and configured for insertion of substantially rectangular protrusion 48 on the inside surface of receptacle housing 40, so that as bottle cap member 6 is longitudinally moved into contact with receptacle housing 40, and a bayonet turn is applied, side channel 16 can be made to move around rectangular protrusion 48 until rectangular protrusion 48 makes contact with the stop 78 within side channel 16, that is shown in FIG. 4 centrally positioned between opposing notches 70. The size of central opening 76 should be sufficient to allow easy movement therethrough of activation pin 26 and prompt lifting of valve closure member 24 away from the outside surface spring housing 14 once bottle cap member 6 is brought longitudinally into contact with receptacle housing 40. Further, the number and dimension of vertically-extending slots 72 and small holes 74 through spring housing 14 are not critical, although for most applications it would be preferred to have approximately 4–6 vertically-extending slots 72 and small holes 74 to allow prompt smooth material flow from holding container 36 into receptacle 38. Although not limited thereto, in the most preferred embodiment it is contemplated for bottle cap member 6 to be formed as a single rigid unit from molded construction, and made from plastic materials.

FIG. 4 shows the bottom surface of the most preferred embodiment of bottle cap member 6 with the ribbed outer surface 8 on its upper portion being separated from an outer bottom rim 18 by a side channel 16, and two opposing notches 70 through outer bottom rim 18. FIG. 4 further shows a stop 78 within side channel 16 centrally between notches 70. Although the most preferred embodiment of the present invention bottle cap system 2 would have a single stop 78 within side channel 16 of bottle cap member 6 for more cost-effective manufacture, it is also considered to be within the scope of bottle cap system 2 to have more that one stop 78, notch 70, or protrusion 48. FIG. 4 further shows bottle cap member 6 having a circular bottom channel 20, a central bottom surface 22 below spring housing 14, with the small holes 74 at the base of spring housing 14 extending through central bottom surface 22. In addition, FIG. 4 shows the tip 80 of the activation pin 26 that is attached to spring-biased valve closure member 24 centrally visible through central bottom surface 22, the disk-like spring nut 30 visible around tip 80, and small holes 74 visible around disk-like spring nut 30. When valve closure member 24 is lifted from the top surface of spring housing 14, dry or liquid material (not shown) from holding container 36 is allowed to flow through small holes 74, beyond disk-like spring nut 30, and into receptacle 38.

Figure 5:
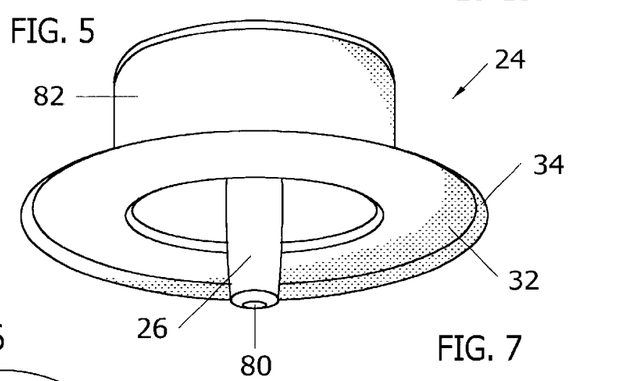
FIG. 5 is a perspective side view of the preferred embodiment of the present invention springbiased valve closure member having a cylindrical main body with an upper closed end and a bottom open end, a downwardly curved flange extending from its open end, and a central activation pin downwardly depending from the upper closed end in a position extending below the outer edge of the flange.

FIG. 5 shows the most preferred embodiment of the present invention spring-biased valve closure member 24 having a substantially cylindrical main body 82 and a hollow interior, with an upper closed end and a bottom open end. FIG. 5 also shows the outwardly extending lower flange 32 around the open end of cylindrical main body 82, with lower flange 32 having a downwardly arcuate outer edge 34. In addition, FIG. 5 shows central activation pin 26 downwardly depending from the interior surface of the upper closed end of cylindrical main body 82, in a position extending below the plane of outer edge 34. Further, in FIG. 5 the tip of activation pin 26 is identified with the number 80. Thus, when valve closure member 24 is seated upon spring housing 14 with its activation pin 26 inserted through the central opening 76 in the upper end of spring housing 14, and a spring 28 is connected between the upper interior surface of spring housing 14 and a disk-like spring nut 30 having a particular cutout pattern 84 with spring nut 30 positioned adjacent to the lower open end of spring housing 14, only a receptacle housing 4 having a spring nut engagement member 50 with tapering upper surfaces 56 allowing for partial insertion through cutout pattern 84 will be able to reach the tip of activation pin 26 and lift valve closure member 24 from its spring housing 14 valve seat to initiate transfer of liquid or dry material (not shown) into a target receptacle 38 secured within a docking station 68. In the most preferred embodiment of bottle cap system 2, valve closure member 24 would be formed as a single rigid unit from molded construction, and made from plastic materials. While it is contemplated that the same plastic material used for bottle cap member 6 could be used in valve closure member 24, the thickness dimension of valve closure member 24 would typically be less than that the thickness dimension of most surfaces of bottle cap member 6. However, the thickness dimension of valve closure member 24 should be sufficient so that the flow of material from holding container 36 across downwardly arcuate outer edge 34 does not cause outer edge 34 to buckle, fold, or otherwise be subject to a change in configuration that would obstruct proper reseating of valve closure member 24 against spring housing 14 after material transfer.

Figure 6:
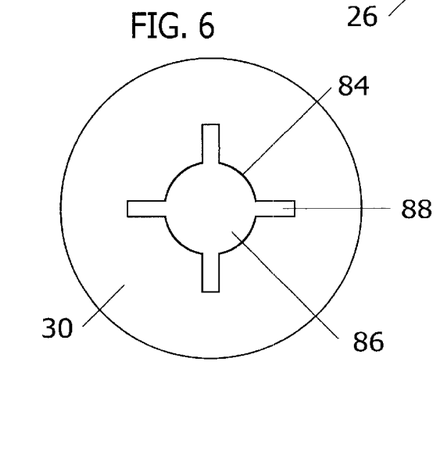
FIG. 6 is a top view of the preferred embodiment of the present invention spring nut having a central cutout pattern comprised of a round hole intersecting an X-shaped opening wherein the length of each arm member of the X-shaped opening is approximately twice that of the diameter dimension of the round hole.

FIG. 6 shows the most preferred embodiment of the present invention spring nut 30 having a disk-like configuration and a central cutout pattern 84 comprising a round hole portion 86 intersecting with an X-shaped opening 88 wherein the length of each arm member of the X-shaped opening 88 is approximately twice that of the diameter dimension of the round hole portion 86. The configuration of cutout pattern 84 is not critical and other patterns are considered to also be within the scope of the present invention. However, cutout pattern 84 must complement the configuration of the upwardly tapering surfaces 56 of spring nut engagement member 50 so that as bottle cap member 6 is moved longitudinally toward receptacle housing 40 and comes very near to receptacle housing 40, upwardly tapering surfaces 56 become partially inserted within cutout pattern 84, and so that when bottle cap member 6 is finally placed in full contact with receptacle housing 40, the top of spring nut engagement member 50 will have made sufficient contact with the tip 80 of activation pin 26 to fractionally raise it and thereby lift valve closure member 24 a short distance away from the top outside surface of spring housing 14 to initiate material flow downwardly past the outer edge 34 of valve closure member 24. Broken lines in FIG. 12 show the direction of material flow anticipated around the downwardly arcuate outer edge 34 in the most preferred embodiment of bottle cap system 2.

Figure 7:
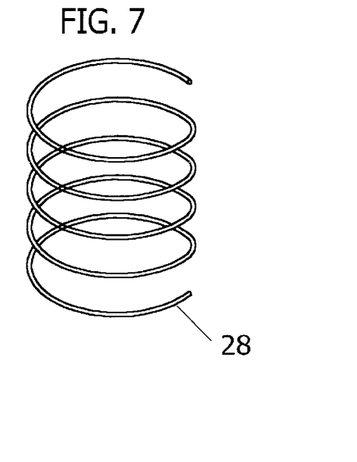
FIG. 7 is a perspective side view of the preferred embodiment of the present invention coil spring having a substantially uniform diameter dimension and uniformly spaced apart coils.
Figures 8, 9, 10:
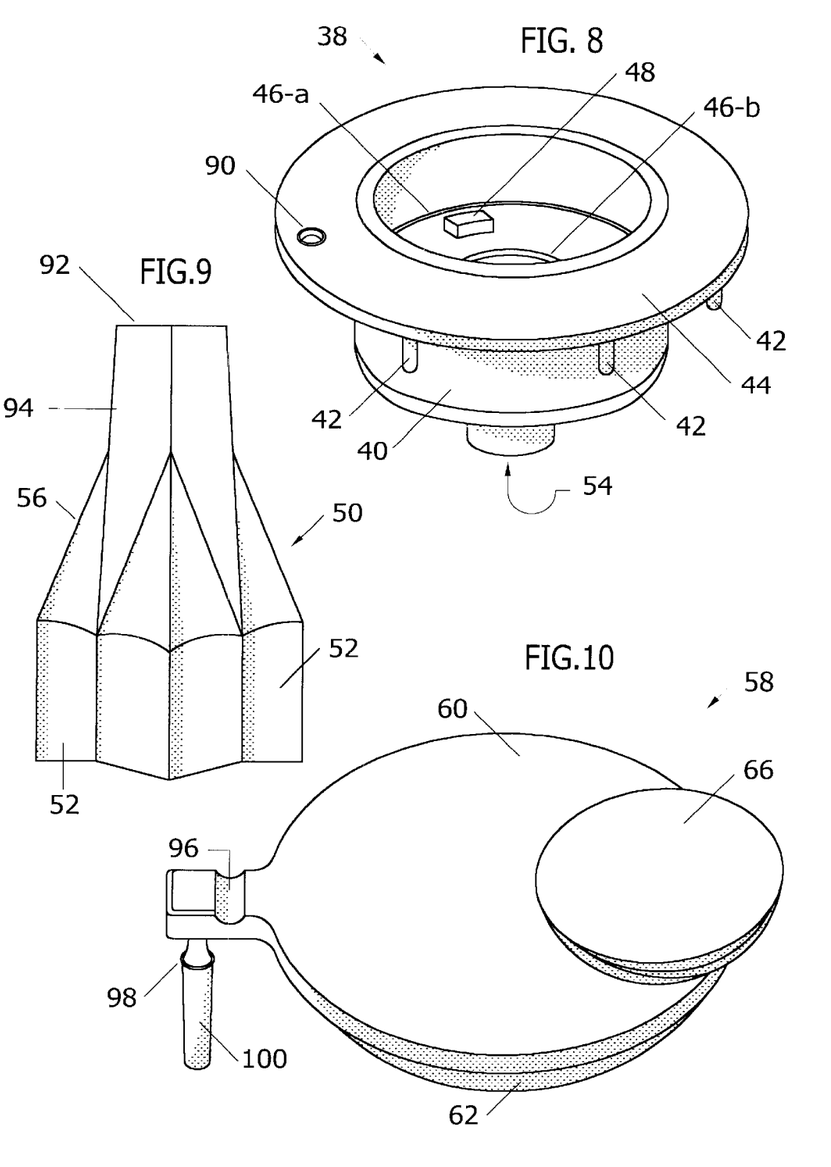
FIG. 8 is a perspective view of the preferred embodiment of the present invention targeted docking station receptacle having a substantially cylindrical housing with a radially extending flange depending from its upper opening, attachment pins downwardly depending from the flange, stepped interior walls, a substantially rectangular-shaped protrusion attached to the inside wall surface of the housing, and a bottom discharge opening, an upwardly tapering spring nut engagement member within the discharge opening that has upper surfaces configured for insertion through the cutout pattern in the spring nut, and also having a dust cap sealing the upper opening in its housing.
FIG. 9 is a side view of the preferred embodiment of the present invention spring nut engagement member permanently secured within the discharge opening in the bottom of the receptacle housing, and which has an upwardly tapering surface configured for insertion through the cutout pattern in the spring nut of the associated dispensing bottle cap assembly.
FIG. 10 is a perspective view of the preferred embodiment of the present invention dust cap employed for sealing the upper opening in the receptacle housing between material transfer uses and having an attachment post as well as a concave hinge member that allows the main body of the dust cap to be rotated upwardly away from the receptacle housing during material transfer.

FIG. 7 shows the most preferred embodiment of the coil spring 28 used in the present invention bottle cap system 2, with spring 28 having a substantially uniform diameter dimension and uniformly spaced apart coils. During use of spring 28 within dispensing bottle cap assembly 4, activation pin 26 centered within spring 28, with spring 28 extending between disk-like spring nut 30 and the circular ridge 12 on the top inside surface of spring housing 14. The number of coils present in spring 28, and the material from which spring 28 is made, are not critical as long as spring 28 can properly bias valve closure member 24 into its fully closed position against the top surface of spring housing 14. Although the diameter of spring housing 14 can vary, it must allow ample clearance for unrestricted movement of the spring 28 chosen for use within its hollow interior. Further, the diameter of spring 28 can vary in different applications, as long as disk-like spring nut 30 is also correspondingly sized to engage it, maintain spring 28 within spring housing 14, and move spring 28 the correct longitudinal distance within spring housing 14 after bottle cap member 6 is finally in full contact with receptacle housing 40 so that the top of spring nut engagement member 50 comes in contact with the tip 80 of activation pin 26 with sufficient force to compress spring 28 and lift valve closure member 24 the necessary distance above spring housing 14 to initiate material flow. After the needed amount of material transfer is complete, bottle cap member 6 is separated from receptacle housing 40, and the upper surfaces 56 of spring nut engagement member 50 are no longer in contact with the tip 80 of activation pin 26, the stored compression energy in spring 28 causes valve closure member 24 to again be biased in a closed position against the outside surface of spring housing 14.

FIG. 8 shows the most preferred embodiment of the targeted receptacle 38 employed in the present invention bottle cap system 2 for use in locking a specifically configured bottle cap member 6 with a docking station 68 for hands-free and spill-free material transfer into a receiving vessel or reservoir (not shown) within docking station 68. FIG. 8 shows receptacle 38 having a substantially cylindrical housing 40 with a radially extending flange 44 depending from its upper opening, attachment pins 42 downwardly depending from flange 44, stepped interior walls 46a and 46b, a substantially rectangular protrusion 48 attached to the inside wall surface of receptacle housing 40, a centrally located bottom discharge opening 54, and an upwardly tapering spring nut engagement member 50 permanently attached within discharge opening 54 that has a tapering upper surface 56 configured for partial insertion through the cutout pattern 84 in a spring nut 30 that is supported within a paired dispensing bottle cap assembly 4. To lock a holding container 36 to receptacle housing 40 and permit spill-free transfer of material therebetween, the protrusion 48 on the inside surface of receptacle housing 4 must be aligned with one of the notches 70 in bottle cap member 6 and a bayonet turn applied to the holding container 36 attached to bottle cap member 6 to both move bottle cap member 6 longitudinally toward receptacle housing 40 and subsequently rotate bottle cap member 6 relative to receptacle housing 40, until the stop 78 within side channel 16, shown in FIG. 4, comes into contact with protrusion 48. It is the movement immediately before contact between bottle cap member 6 and receptacle housing 40 that causes valve closure member 24 to be sufficiently unseated from spring housing 14 to start material transfer flow. In the most preferred embodiment of bottle cap system 2, it is not contemplated for more than a fractional movement of valve closure member 24 to take place, for example but not limited to a distance of one-sixteenths of an inch, before it is sufficiently unseated from spring housing 14 to initiate material flow around outer edge 34. FIG. 8 also shows an attachment hole 90 near to the outer edge of flange 44, which can be used for the insertion of an attachment post 100 to connect dust cap 58 within the top open end of receptacle housing 40. The diameter of attachment hole 90 would correspond to the dimension required for insertion of attachment post 100 to the depth needed for proper seating of lower rim 62 within the top open end of receptacle housing 40.

FIG. 9 shows the most preferred embodiment of the spring nut engagement member 50 in present invention bottle cap system 2 having a plurality of flukes 52 around its lower portion, each with an upwardly tapering edge 56. Although the number of flukes 52 attached to spring nut engagement member 50 can vary, to properly interact with disk-like spring nut 30 and allow the top of spring nut engagement member 50 to engage the tip of activation pin 26 and lift it just enough to unseat valve closure member 26 the proper amount so that even material flow can begin, the configuration of upwardly tapering edges 56 must be able to be partially inserted through cutout pattern 84. In the most preferred embodiments of disk-like spring nut 30 and spring nut engagement member 50, shown respectively in FIGS. 6 and 9, spring nut engagement member 50 would have four flukes 52 with the upper tapering surface 56 of each fluke 52 being aligned to engage a different one of the arm members in the X-shaped opening 88. Although separately shown in FIG. 9, it is contemplated that spring nut engagement member 50 would be permanently secured within the discharge opening 54 in the bottom of receptacle housing 40, where flukes 52 would allow easy and unimpeded flow of material through discharge opening 54. It is also contemplated that spring nut engagement member 50 would be manufactured from the same material used make receptacle housing 40, and in the most preferred embodiment spring nut engagement member 50 and receptacle housing 40 would be made as a single unit through molded construction.

FIG. 10 shows the most preferred embodiment of the dust cap 58 in present invention bottle cap system 2 employed for sealing the top open end of receptacle housing 40 between material transfer uses. FIG. 10 shows dust cap 58 having an attachment post 100, as well as a concave hinge member 96 that allows the main body 60 of dust cap 58 to be rotated upwardly away from receptacle housing 40 prior to and during material transfer, and lowered for renewed engagement with the top open end of receptacle housing 40 after material transfer. Attachment post 100 is used to securely connect the rearward end of dust cap 58 to flange 44. A retaining ring 98 helps to prevent attachment post 100 from being inadvertently removed from flange 44 while the lower rim 62 of dust cap 58 is being inserted into and removed from the top open end of receptacle housing 40. Concave hinge member 96 allows main body 60, raised portion 66, and lower rim 62 as a unit to be rotated upwardly away from the top open end of receptacle housing 40, so that holding container 36 connected by threaded attachment to bottle cap member 6 can be placed into locking engagement with receptacle housing 40 for material transfer. Although not limited thereto, in the most preferred embodiments of present invention 2 the entire dust cap 58, or at least main body 60, raised portion 66, and lower rim 62 would be made from a flexible material such as plastic or rubber. It is contemplated for front raised portion 66 to be used to improve the grip of an operator's hand on dust cap 58 for easy lifting of dust cap 58 away from receptacle 38 or replacing dust cap 58 within the top open end of receptacle housing 40 between material flow uses. Although FIG. 10 shows front raised portion 66 having a substantially circular configuration, it is considered to be within the scope of the present invention for any shape to be used that is aesthetically pleasing and easily manipulated by an operator's hand. FIG. 10 shows the top surface of front raised portion 66 having no surface decoration, in contrast to the raised circular protrusions 64 shown in FIG. 2. Surface decoration on raised portion 66 is considered to be merely a matter of design choice, although some raised decorative patterns, such as circular protrusions 64 in FIG. 2, could assist in an improved operator grip. In the most preferred embodiment of bottle cap system 2, it is not contemplated for raised portion 66 to be separable from main body 60.

FIGS. 11 and 12 respectively show dispensing bottle cap system 2 in partially assembled and fully assembled condition. FIG. 11 shows dispensing bottle cap assembly 4 partially inserted within receptacle housing 40 prior to full contact with the bottom inside surface of housing 40, illustrated by the gap 102 and small arrows between the central bottom surface 22 of bottle cap member 6 and the bottom inside surface of receptacle housing 40. As also shown in FIG. 11, valve closure member 24 remains in a closed position against the top surface of spring housing 14 so as to prevent material flow. In contrast, FIG. 12 shows dispensing bottle cap assembly 4 fully inserted within receptacle housing 40, after the bayonet turn has been made that locks dispensing bottle cap assembly 4 to receptacle housing 40, with the central bottom surface 22 of bottle cap member 6 being in full contact with the bottom inside surface of receptacle housing 40, as illustrated by the gaps 102 and small arrows between valve closure member 24 and the top surface of spring housing 14, as well as between the inside bottom surface of bottle cap member 6 and the outer edge 34 of the flange 32 that is radially depending from valve closure member 24. In such a position, FIG. 12 shows valve closure member 24 in an open configuration that allows material flow from an inverted holding container 36 attached to dispensing bottle cap assembly 4, all the way through a receptacle 38 specifically configured to receive dispensing bottle cap assembly 4 and become securely locked to it, and into a receiving vessel (not shown) within a docking station 68. The amount of separation in FIG. 12 between outer edge 34 and the inside bottom surface of bottle cap member 6 is enlarged for illustrative purposes. As shown in FIGS. 11 and 12, the most preferred embodiment of dispensing cap assembly 4 comprises a bottle cap member 6 with an arcuate open end having spiral threads 10 configured for attachment to the threaded configuration on holding container 36 from which a quantity of fluid or dry material (not shown) must be transferred. FIGS. 11 and 12 also show bottle cap member 6 having a substantially sealed end, of which upwardly depending spring housing 14 is a part, and stepped interior walls with obtuse angles between adjacent risers and the horizontally extending surface next below. The openings in the substantially sealed end of bottle cap member 6 include a plurality of small holes, shown by the number 74 in FIGS. 3 and 4, which are spaced apart from one another and positioned around the base of spring housing 10, and the central opening, shown in FIG. 3 by the number 76, through the top of spring housing 14 and through which the activation pin 26 of valve closure member 24 is inserted during use. Spring housing 14 is hollow and substantially cylindrical in configuration with a small downwardly depending circular ridge 12 on its inside surface adjacent to central opening 76. Circular ridge 12 maintains spring 28 in a substantially centered position within spring housing 14 during material transfer use. FIGS. 11 and 12 show spring housing 14 substantially centered within the sealed end of bottle cap member 6 and an indentation on both sides of bottle cap member 6, the being identified by the number 16 which represents a side channel around the outside surface of bottle cap member 6 adjacent to its sealed end, between an outer bottom rim 18 and the upper vertically ridged surface 8 used to securely grip bottle cap member 6 during its attachment and/or removal from a material holding container 36. Thus, spring housing 14 performs the function of a valve seat for valve closure member 24, has a plurality of spaced-apart slots, shown by the number 72 in FIG. 3, on its outer surface with each slot communicating with a different one of the small holes 74 around the base of spring housing 14, also has a top closed end with a central opening 76 that accommodates activation pin 26 during material transfer, and further has a bottom open end that is used for receipt of coil spring 28 and positioning of disk-like spring nut 24. FIG. 11 further shows dust cap 58 in a partially opened position above the upper opening in receptacle housing 40, with double-headed arrows showing that dust cap 58 can be moved in both upward and downward directions relative to receptacle housing 40 when required. Dust cap 58 is employed for sealing the upper opening in receptacle housing 40 between material transfer uses, with dust cap 58 being attached to flange 44 through use of an attachment post 100 and attachment hole 90 shown in FIG. 8. A ring 98 would keep attachment post 100 from being inadvertently removed from flange 44 while in use. A concave hinge member 96 allows main body 60, raised portion 66, and lower rim 62 to be rotated upwardly as a unit away from the top end opening in receptacle housing 40, so as not to adversely interfere with holding container 36 while it is connected by threaded attachment to a bottle cap member 6 in locked engagement with receptacle 38.

FIGS. 11 and 12 also show the most preferred embodiment of the receiving vessel receptacle 38 of present invention 2 to which bottle cap assembly 4 is locked for dry or fluid material transfer into a receiving vessel or a reservoir (not shown) within a docking station 68. When docking station 68 has a balanced and stable configuration, hands-free material transfer can occur after bottle cap assembly 4 is locked into receptacle housing 40 with a bayonet turn. The receptacle housing 40 is substantially cylindrical with an open top end, a radially extending flange 16 adjacent to the top end, a discharge opening 54 centrally within its bottom end, a hollow interior with stepped walls 46a–c that decrease in diameter toward the bottom end, a substantially rectangular protrusion, shown in FIGS. 9 and 10 by the number 48, inwardly depending from the upper end of the middle interior wall 46b, and a spring nut engagement member 30 secured within discharge opening 54. Spring nut engagement member 50 has top surfaces, such as upper edges 56 in FIG. 9, configured for partial insertion through a particular cutout pattern, shown in FIG. 6 by the number 84, in the disk-like spring nut 30 positioned at the open end of spring housing 14, as well as a plurality of spaced-apart flukes 52 radially extending from the middle and lower portions of its outside surface, with each fluke 52 having a downwardly sloping upper surface 56. Flukes 52 allow for rapid, even, and unimpeded flow of material through discharge opening 54. In addition, the flange 44 radially extending from the upper end of receptacle housing 40 provides a connection means for attachment of receptacle housing 40 to a receiving vessel or docking station 68, as well as a connection means for attachment of a removable dust cap 58 to the open end of receptacle housing 40 between periods of material transfer use. Although FIGS. 11 and 12 show opposed attachment pins 42 connecting flange 44 to docking station 68, the use of attachment pins 42 is not critical and other connection means are also contemplated to be within the scope of the present invention. Thus, when a substantially cylindrical valve closure member 24 having a hollow interior, a closed end, and an open end, with an outwardly extending flange 32 adjacent to its open end and an activation pin 26 centrally connected to the interior surface of the closed end and downwardly extending beyond the outer edge 34 of outwardly extending flange 32, is seated upon spring housing 14 with its activation pin 26 inserted through the central opening 76 in the upper end of spring housing 14, and a spring 28 is connected between the upper interior surface of spring housing 14 and a disk-like spring nut 30 having a particular cutout pattern 84 so that disk-like spring nut 30 becomes positioned adjacent to the lower open end of spring housing 14, only a receptacle housing 40 having a spring nut engagement member 50 with tapering upper surfaces 56 allowing partial insertion through cutout pattern 84 will be able to make contact with rigid activation pin 26 so as to fractionally raise it and thereby lift valve closure member 24 from its spring housing 14 valve seat to begin transfer of liquid or dry material (not shown) into a target reservoir within docking station 68. Further, to lock the holding container 36 to the docking station 68 and permit hands-free transfer of material therebetween once the locking connection is made, the protrusion 48 on receptacle housing 40 must be aligned with one of the bottle cap notches 70 and a bayonet turn applied to the attached holding container 36 to both rotate bottle cap member 6 relative to receptacle housing 40, as well as move bottle cap member 6 longitudinally toward receptacle housing 40, before valve closure member 24 can be sufficiently unseated from spring housing 14 to allow material transfer. Dispensing system 2 has a simple design and can be used by manufacturers of equipment requiring replacement dry and liquid products to limit the source of those products.

Although obvious variations are also considered to be within the scope of the present invention, manufacture of the most preferred embodiment of dispensing system 2 would start with the unitary construction of bottle cap member 6, valve closure member 24, disk-like spring nut 30, and receptacle 38, each from molded plastic. The manufacture of spring 28 is not limited to any one type of material. However, it should have sturdy and durable construction for trouble-free repeat use over an extended period of time. The spring nut engagement member 50 in the most preferred embodiment would be molded in a fixed position within discharge opening 54 as part of receptacle 38. Dispensing bottle cap assembly 4 would be placed into its usable form by inserting valve closure member 24 within bottle cap member 6 so that activation pin 26 extends through central aperture 74 in spring housing 14. A coil spring 28 would be placed within the hollow interior of spring housing 14 either before or after activation pin 26 is inserted therethrough, and then prevented from being withdrawn from the open end of spring housing 14 by disk-like spring nut 30. When valve closure member 24 is in its fully closed position against the top surface of spring housing 14, and preventing communication between the upper portion of bottle cap member and small holes 74 around the base of spring housing 14, activation pin 26 would extend a small distance below the central bottom surface 22 of bottle cap member 6. No further assembly would be required to place receptacle 38 into its usable condition, except that a dust cap 58 made from a unitary molded construction and flexible material can be placed within the upper opening of receptacle to keep unwanted objects from becoming deposited on the interior walls of receptacle 38 so that it does not require cleaning between uses.

We claim:

1. A gravity-assisted dispensing system for hands-free and spill-free transfer of liquid and dry materials from a holding container into receiving vessel, said system comprising:
   i.) a dispensing assembly comprising:
      a.) a bottle cap member configured for threaded connection to the neck opening of the type of holding container with which said dispensing system will typically be used for material transfer, and having a bottom surface, a central spring housing upwardly depending from said bottom surface, said spring housing having a top central opening, a plurality of spaced-apart material transfer holes through said bottom surface;
      b.) valve closure means adapted for close association with said spring housing to block material flow through said material transfer holes, and having an activation pin centrally extending through said top central opening and said spring housing when in a closed position;
      c.) spring means within said spring housing and adapted for biasing said valve closure means into said closed position;
      d.) spring retaining means associated with said spring housing adapted for maintaining said spring means within said spring housing; and
   ii.) a receptacle comprising:
      (a) a housing having a top end opening sufficiently wide for receipt of said entire bottle cap member, an inside surface, and a bottom discharge opening;
      (b) at least one protrusion on said inside surface of said receptacle at a height allowing each said protrusion to enter said side channel of said bottle cap member once said dispensing assembly is fully positioned within said receptacle housing;
      (c) a flange radially extending from said top end opening of said receptacle housing; and
      (d) a spring nut engagement member secured within said discharge opening, said spring nut engagement member and having tapering upper surfaces configured for partial insertion through said cutout pattern in said spring nut and a top end;
   whereby spill-free material transfer is achieved when said dispensing assembly is secured around the neck opening of a holding container, and the holding container is inverted, and said discharge opening of said receptacle is in communication with a receiving vessel, since material within the holding container is not transferred into said receptacle until said bottle cap member is fully within said receptacle housing against said inside surface so that said top end of said spring nut engagement member contacts said activation pin a sufficient amount to unseat said valve closure means fractionally from said spring housing and reveal said spaced-apart material transfer holes adjacent to said spring housing, and whereby material flow ceases as soon as said bottle cap member starts to be withdrawn longitudinally from said receptacle housing and said activation pin breaks contact with said top of said spring nut engagement member and allows reseating of said valve closure means against said spring housing well before said bottle cap member leaves said receptacle.

2. The system of claim 1 wherein said bottle cap member, said receptacle housing, and said valve closure means are all formed from unitary molded construction.

3. The system of claim 1 further comprising a dust cap configured for temporary sealing of said top end opening between material transfers.

4. The system of claim 3 wherein said flange further comprises an attachment hole, and said dust cap further comprises a main body, an attachment post depending rearwardly from said main body and being configured for insertion within said attachment hole, retaining means adapted for retaining said attachment post within said attachment hole, and hinge means adapted for maintaining connection of said main body to said attachment post during periods of material transfer when said main body must be temporarily removed from said top end opening of said receptacle housing.

5. The system of claim 4 wherein said attachment post further comprises a proximal end, wherein said retaining means comprises a retaining ring on said proximal end of said attachment post, and wherein said hinge means comprises a flexible concave portion between said main body and said attachment post.

6. The system of claim 4 wherein said dust cap has a front raised portion configured for enhanced leverage in removal of said dust cap from said top end opening in said receptacle.

7. The system of claim 1 wherein said valve closure means further comprises a valve closure member with an outwardly directed flange having a downwardly arcuate edge configured for engagement with said inside surface of said housing to block material flow through said spaced-apart material transfer holes when said valve closure member is in said closed position.

8. The system of claim 1 wherein said spring housing further comprises a number of longitudinally extending slots identical to the number of said spaced-apart openings, and further wherein said each said slot communicates with a different one of said spaced-apart material transfer holes.

9. The system of claim 1 wherein said spring housing has an inner ring adjacent to said top central opening in said spring housing, with said inner ring being configured for centrally securing said spring means within said spring housing.

10. The system of claim 1 further comprising a plurality of attachment pins connected to said radially extending flange, each said attachment pin being configured for secure connection of said receptacle to a receiving vessel.

11. The system of claim 1 wherein said bottle cap member further comprises a ribbed outer surface configured for easy manipulation of bottle cap member during its attachment and removal from a holding container.

12. The system of claim 1 wherein said spring nut engagement member has a plurality of outwardly extending flukes which jointly having an upper surface configuration adapted for engagement with said spring nut.

13. A gravity-assisted dispensing system for hands-free and spill-free transfer of liquid and dry materials from a holding container into receiving vessel, said system comprising:

i.) a dispensing assembly comprising:
   e.) a bottle cap member configured for threaded connection to the neck opening of the type of holding container with which said dispensing system will typically be used for material transfer, and having a bottom surface, a central spring housing upwardly depending from said bottom surface, said spring housing having a top central opening, a plurality of spaced-apart holes through said bottom surface adjacent to said spring housing, a bottom rim, at least one notch through said bottom rim, and a side channel adjacent to and immediately above said bottom rim;
   f.) a coil spring having opposing ends and positioned for longitudinal compression within said spring housing, with a first one of said ends being adjacent to said top central opening in said spring housing;
   g.) a disk-like spring nut positioned for engagement with said second end of said spring and having a cutout pattern therethrough; and
   h.) a substantially cylindrical valve closure member with a hollow interior, a rigid activation pin centrally extending through said hollow interior, with said activation pin having a tip and extending through said central opening and said spring housing when said valve closure member is in a closed position against said top central opening and covering said spaced-apart holes; and ii.) a receptacle comprising:
   (e) a housing having a top end opening sufficiently wide for receipt of said entire bottle cap member, an inside surface, and a bottom discharge opening;
   (f) at least one protrusion on said inside surface of said receptacle at a height allowing each said protrusion to enter said side channel of said bottle cap member once said dispensing assembly is fully positioned within said receptacle housing;
   (g) a flange radially extending from said top end opening of said receptacle housing; and
   (h) a spring nut engagement member secured within said discharge opening, said spring nut engagement member having tapering upper surfaces configured for partial insertion through said cutout pattern in said spring nut and a top end;

whereby spill-free material transfer is achieved when said dispensing assembly is secured around the neck opening of a holding container, and the holding container is inverted, and said discharge opening of said receptacle is in communication with a receiving vessel, since material within the holding container is not transferred into said receptacle until said bottle cap member is fully within said receptacle housing against said inside surface so that said top end of said spring nut engagement member contacts said tip of said activation pin a sufficient amount to unseat said valve closure member fractionally from said spring housing and reveal said spaced-apart holes adjacent to said spring housing, and whereby material flow ceases as soon as said bottle cap member starts to be withdrawn longitudinally from said receptacle housing and said tip of said activation pin breaks contact with said top of said spring nut engagement member and allows reseating of said valve closure member against said spring housing well before said bottle cap member leaves said receptacle, and further whereby once said bottle cap member is fully within said receptacle housing said inside channel can be rotated around each said protrusion for locking engagement of said dispensing assembly to said receptacle and hands-free material transfer.

14. The system of claim 13 further comprising a dust cap configured for temporary sealing of said top end opening between material transfers.

15. The system of claim 13 wherein said valve closure member further comprises an outwardly directed flange with a downwardly arcuate edge configured for engagement with said inside surface of said housing to block material flow through said spaced-apart holes when said valve closure member is in said closed position.

16. The system of claim 13 further comprising a plurality of attachment pins connected to said radially extending flange, each said attachment pin being configured for secure connection of said receptacle to a receiving vessel.

17. The system of claim 13 further comprising at least one stop positioned within said side channel of sizable configuration to contact said protrusion and halt rotation of said bottle cap member relative to said receptacle housing to place said bottle cap member in locked engagement with said receptacle housing, each said stop having a location within said side channel positioned remotely from each said notch.

18. A method of manufacture for a gravity-assisted dispensing system that allows hands-free and spill-free transfer of liquid and dry materials from a holding container into receiving vessel, said method comprising the steps of:

providing a dispensing assembly comprising a bottle cap member having spiral threads, a spring housing upwardly depending from its bottom surface, a bottom rim, and a side channel adjacent to and immediately above said bottom rim; a coil spring; a disk-like spring nut having a cutout pattern therethrough; and substantially cylindrical valve closure member with a hollow interior, a rigid activation pin when said valve closure member is in a closed position against said top central opening and covering said spaced-apart holes; and also providing a receptacle comprising a housing having a top end opening sufficiently wide for receipt of said entire bottle cap member, an inside surface, and a bottom discharge end opening of said receptacle housing, and a spring nut engagement member in said discharge opening that has tapering upper surfaces configured for partial insertion through said cutout pattern in said spring nut and a top end;

forming a plurality of material transfer holes through said bottom surface of said bottle cap member adjacent to said spring housing;

forming a top central opening in said spring housing;

forming at least one notch through said bottom rim;

inserting said valve closure member within said bottle cap member so that said activation pin is centrally extended through said central opening as well as said spring housing, and said hollow interior of said valve closure member is positioned closely around said spring housing;

concurrently placing said spring within spring housing around said activation pin; and securing said spring within said spring housing with said spring nut to bias said valve closure member in a closed position around said spring housing so that when said valve closure member is in said closed position communication between any upper portion of said bottle cap member and said material transfer holes is blocked, until and only when said dispensing assembly is placed entirely within said receptacle with said bottom rim toward said discharge opening and said top end of said spring nut engagement member pushes against said activation pin to lift said valve closure member away from said spring housing, for spill-free material transfer of material from said dispensing assembly into said receptacle, and wherein hands-free material transfer can occur when each said protrusion is placed within said inside channel and said channel is rotated relative to said receptacle housing to lock said dispensing assembly to said receptacle.

19. The method of claim 18 further comprising the steps of providing a dust cap and securing said dust cap onto said radially extending flange.

20. The method of claim 18 further comprising the steps of providing at least one stop and positioning each said stop within said side channel at a location remote from each said notch.

* * * * *